United States Patent Office 3,439,021
Patented Apr. 15, 1969

3,439,021
HALO-SUBSTITUTED PHENOXYETHYL CARBAMATES AND DERIVATIVES THEREOF
Llewellyn W. Fancher, Orinda, Calif., assignor to Stauffer Chemical Company, New York, N.Y., a corporation of Delaware
No Drawing. Continuation-in-part of application Ser. No. 367,879, May 15, 1964. This application Dec. 23, 1966, Ser. No. 604,136
Int. Cl. C07c 125/04, 125/06
U.S. Cl. 260—482   8 Claims

ABSTRACT OF THE DISCLOSURE

The compounds of the class halo-substituted phenyl oxyethyl esters of N-alkyl carbamic acids having the general formula

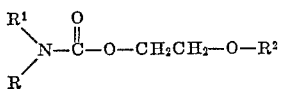

wherein R and $R^1$ are selected from the group consisting of hydrogen, lower alkyl having from 1 to 6 carbon atoms, inclusive, and lower alkenyl having from 2 to 6 carbon atoms, inclusive, at least one of R and $R^1$ is a group other than hydrogen; and $R^2$ is selected from the group consisting of nuclearly substituted phenyl, wherein said substituents are from 1 to 5 halogens, inclusive, especially chlorine; for example, 2,4-dichlorophenoxyethyl-N-methyl carbamate and 2,4,5-trichlorophenoxyethyl-N,N-di-n-propyl carbamate.

The compounds of the class are useful as preemergence and post-emergence herbicides. The compounds can be prepared by condensing a halophenyl oxyethanol and an alkyl isocyanate or condensing a halophenyl oxyethanol with an N,N-dialkyl carbamyl chloride.

---

This application is a continuation-in-part of my copending application, Ser. No. 367,879, filed May 15, 1964, now abandoned.

This invention relates to certain new and novel organic compounds which may be used as herbicides. More specifically, this invention relates to certain substituted phenyl oxyethyl-N-alkyl carbamates and to the use of such compounds in herbicidal compositions.

The compounds comprising the instant class are esters of N-alkyl carbamic acids and correspond to the general formula

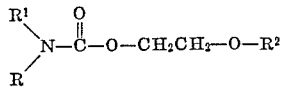

wherein R and $R^1$ are selected from the group consisting of hydrogen, lower alkyl having from 1 to 6 carbon atoms, inclusive, and lower alkenyl having from 2 to 6 carbon atoms, inclusive, at least one of R and $R^1$ is a group other than hydrogen; and $R^2$ is selected from the group consisting of nuclearly substituted phenyl, wherein said substituents are from 1 to 5 halogens, inclusive, especially chlorine.

As examples of organic lower alkyl groups having from 1 to 6 carbon atoms which can be used for R and $R^1$ are methyl, ethyl, propyl, butyl, and hexyl. Similarly, examples of lower alkenyl having from 2 to 6 carbon atoms are vinyl, allyl, iso-propenyl, 2-butenyl, 2-pentenyl, 1,3-butydienyl, and 2-hexenyl.

The compounds herein contemplated can be prepared by several methods. The monoalkyl carbamic acid derivatives were prepared by known methods, such as the reaction between the corresponding halo phenyl oxyethanol and an alkyl isocyanate. The addition of an organic base, such as triethylamine and the like, acts as catalysts to facilitate the completion of the reaction. The reaction proceeds readily in the liquid phase. The incorporation of an inert organic solvent is also useful, facilitating processing as well as agitation of the reactants. Temperatures that permit operation in the liquid phase and which are between room temperature and reflux temperature of the solvent, if any is used, are employed. Preferably the reaction mixture is refluxed, usually at an elevated temperature.

The dialkyl carbamic acid derivatives were prepared by the known reaction of an alcohol; e.g., a halo phenyl oxyalkanol with an N,N-dialkyl carbamyl chloride. In some instances it was found to be advantageous to use as a catalyst, such as cupric chloride, to increase the reaction rate. The reaction involved the use of a slight excess of carbamyl chloride, heated usually between 50° C. to 100° C. with the desired aryloxy alcohol.

It has been found that the compounds of the present invention are particularly effective as herbicides. They are effective in the control of grasses and broadleaf plants with both pre-emergence and post-emergence activity.

The compounds of the present invention may be made in accordance with the following examples.

EXAMPLE 1

2,4-dichlorophenoxyethyl-n-methyl carbamate

This example is representative of the preparation of monoalkyl carbamic acid derivatives within the embodiment of the present invention. In 75 ml. of chloroform was dissolved 20.7 g. (0.1 M) of 2,4-dichlorophenoxyethanol with warming. Two drops of triethylamine were added as a catalyst thereby followed with the rapid addition of 6.8 g. (0.12 M) of methylisocyanate. The reaction mixture was then refluxed for three hours on a steam bath. The solvent and excess methylisocyanate were removed on a steam bath with an air jet. The solid product, 2,4-dichlorophenoxyethyl-N-methyl carbamate, weighed 23.5 g. (89% of theory), M.P. 73–74° C.

Analysis calculated for $C_{10}H_{11}Cl_2NO_3$; Chlorine 26.9%; nitrogen, 5.3%. Found: chlorine, 26.7%; nitrogen, 5.0%.

EXAMPLE 2

2,4,5-trichlorophenoxyethyl-N,N-di-n-propyl carbamate

This example is representative of the preparation of N,N-dialkyl carbamic acid derivatives of the present invention. In 11.4 g. (0.07 M) of N,N-di-n-propyl-carbamoyl chloride were dissolved by warming 12.1 g. (0.05 M) of 2,4,5-trichlorophenoxyethanol. To the reaction mixture was added 0.1 g. of cupric chloride dihydrate and hydrogen chloride evolution began at once. The mixture was heated on the steam bath under an air condenser for two hours. Excess carbamoyl chloride was removed with an air purge. The product was taken up in benzene, washed with dilute hydrochloric acid followed by a water wash. After drying over anhydrous magnesium sulfate the product was filtered and the solvent removed on a steam bath with an air jet. The liquid product weighed 18.1 g. (98% of theory), $n_D^{30}=1.5218$.

Analysis calculated for $C_{15}H_{20}Cl_3NO_3$ percent: C, 28.9; N, 3.8. Found: C, 28.7; N, 3.9.

The following is a table of the compounds prepared according to the aforedescribed procedures. Compound numbers have been assigned to each compound and are used throughout the balance of the application.

TABLE I

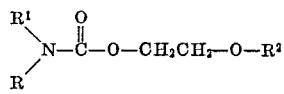

| Compound No. | R¹ | R | R² |
|---|---|---|---|
| 1[1] | Methyl | H | 2,4-dichlorophenyl. |
| 2 | Ethyl | H | Do. |
| 3 | n-Butyl | H | Do. |
| 4 | Ethyl | H | 2,4,5-trichlorophenyl. |
| 5 | n-Butyl | H | Do. |
| 6 | Ethyl | H | Pentachlorophenyl. |
| 7 | do | Ethyl | 2,4,5-trichlorophenyl. |
| 8 | Methyl | Methyl | Do. |
| 9[1] | n-Propyl | n-Propyl | Do. |
| 10 | Ethyl | Ethyl | 2,4-dichlorophenyl. |
| 11 | Methyl | Methyl | Do. |
| 12 | n-Propyl | n-Propyl | Do. |
| 13 | Allyl | Allyl | Do. |
| 14 | do | do | 2,4,5-trichlorophenyl. |
| 15 | Ethyl | n-Butyl | 2,4-dichlorphenyl. |
| 16 | do | do | 2,4,5-trichlorophenyl. |
| 17 | Methyl | H | Do. |

[1] No. 1 prepared in Example 1. No. 9 prepared in Example 2.

As previously mentioned, the herein described novel compositions produced in the above described manner are phytotoxic compounds which are useful and valuable in controlling various plant species. The compounds of this invention were tested as herbicides in the following manner.

Pre-emergence herbicide test

The seeds of crab grass, foxtail, water grass, Pigweed, Indian mustard and dock were planted in individual rows one-half inch deep in Santa Cruz sandy loam soil contained in compressed paper flats 8¼" x 6½" which are 2¾" deep. Enough seeds were planted to give about thirty to fifty plants each of the weed species in each flat. The flats were watered after planting. The following day each flat was sprayed at the rate of 20 pounds of the candidate compound under test in 80 gallons of solution per acre. An atomizer was used to spray the solution on the soil surface. Two weeks later the degree of weed control was determined by comparing the amount of germination and growth of each weed in the treated flats with weeds in several untreated control flats. The results of this test are reported in Table II.

TABLE II.—PRE-EMERGENCE ACTIVITY RATE, 20 LBS./A

| Compound No. | Crab grass | Foxtail | Water grass | Pigweed | Indian Mustard | Dock |
|---|---|---|---|---|---|---|
| 2 | +++ | ++ | +++ | +++ | +++ | +++ |
| 3 | +++ | +++ | +++ | +++ | +++ | +++ |
| 4 | + | − | − | − | − | − |
| 7 | + | − | − | − | − | + |
| 10 | +++ | +++ | + | − | +++ | + |
| 11 | +++ | +++ | ++ | +++ | +++ | +++ |
| 12 | − | + | ++ | +++ | +++ | +++ |
| 13 | +++ | ++ | +++ | +++ | +++ | +++ |
| 14 | +++ | +++ | +++ | +++ | ++ | +++ |
| 15 | +++ | +++ | − | +++ | +++ | ++ |
| 17 | + | − | − | +++ | − | − |

+=slight injury, ++=moderate injury, +++=severe injury or death

Post-emergence herbicides test

The seeds of crab grass, water grass, Indian mustard, dock and pinto bean were planted in individual rows as described in the pre-emergence test, supra. Two weeks after treatment the plant foliage were sprayed with a rate equivalent to 12.5 pounds per acre. Two weeks after treatment the injury results were recorded using a similar rating system as used in the pre-emergence test. Table III lists the results obtained therefrom.

TABLE III.—POST-EMERGENCE ACTIVITY RATE, 12.5 LBS./A

| Compound No. | Crab grass | Water grass | Indian Mustard | Dock | Pinto bean |
|---|---|---|---|---|---|
| 1 | + | − | +++ | − | +++ |
| 2 | ++ | + | +++ | ++ | ++ |
| 3 | − | − | +++ | +++ | − |
| 5 | − | − | +++ | − | − |
| 7 | − | − | − | − | ++ |
| 8 | +++ | + | + | + | ++ |
| 10 | +++ | +++ | +++ | +++ | + |
| 11 | − | − | +++ | + | ++ |
| 12 | +++ | − | +++ | +++ | ++ |
| 13 | +++ | ++ | +++ | +++ | +++ |
| 14 | +++ | + | +++ | ++ | ++ |
| 15 | +++ | ++ | +++ | +++ | ++ |
| 16 | + | + | + | + | + |

+=slight injury, ++=moderate injury, +++=severe injury or death.

The compounds of the present invention may be used as pre-emergence or post-emergence herbicides and may be applied in a variety of ways at various concentrations. In practice the compounds are formulated with an inert carrier, utilizing methods well known to those skilled in the art, thereby making them suitable for application as dusts, sprays, or drenches. The amount applied will depend on the nature of the seeds or plants to be controlled and the rate of application may vary from 1 to 50 pounds per acre. One particularly advantageous way of applying the compounds is as a narrow band along a row crop, straddling the row.

Various changes and modifications may be made without departing from the spirit and scope of the invention described herein as will be apparent to those skilled in the art to which it pertains. It is accordingly intended that the present invention shall only be limited by the scope of the appended claims.

I claim:
1. The esters of N-alkyl carbamic acid corresponding to the formula

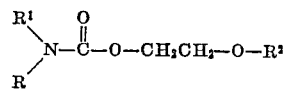

wherein R and R¹ are selected from the group consisting of hydrogen, lower alkyl having from 1 to 6 carbon atoms, inclusive, and lower alkenyl having from 2 to 6 carbon atoms, inclusive, at least one of R and R¹ is a group other than hydrogen; and R² is a nuclearly substituted phenyl group wherein said substituents are from 1 to 5 chlorine atoms, inclusive.

2. A compound according to claim 1 wherein R is hydrogen, R¹ is methyl, and R² is 2,4-dichlorophenyl.

3. A compound according to claim 1 wherein R is ethyl, R¹ is ethyl, and R² is 2,4,5-trichlorophenyl.

4. A compound according to claim 1 wherein R is hydrogen, R¹ is n-butyl, and R² is 2,4,5-trichlorophenyl.

5. A compound according to claim 1 wherein R is n-butyl, R¹ is ethyl, and R² is 2,4,5-trichlorophenyl.

6. A compound according to claim 1 wherein R is n-propyl, R¹ is n-propyl, and R² is 2,4-dichlorophenyl.

7. A compound according to claim 1 wherein R is hydrogen and R¹ is lower alkyl having 1 to 6 carbon atoms, inclusive.

8. A compound according to claim 1 wherein R is lower alkyl having 1 to 6 carbon atoms, inclusive and R¹ is lower alkyl having 1 to 6 carbon atoms, inclusive.

(References on following page)

References Cited

UNITED STATES PATENTS

| | | | |
|---|---|---|---|
| 2,776,196 | 1/1957 | Gysin et al. | 260—479 |
| 3,142,693 | 7/1964 | Weiss et al. | 260—455 |
| 3,238,036 | 3/1966 | Herrett | 260—482 XR |
| 3,277,142 | 10/1966 | Zerbe et al. | 260—455 |
| 3,330,642 | 7/1967 | Barron et al. | 260—479 XR |

FOREIGN PATENTS 253,656  12/1948  Switzerland.

LORRAINE A. WEINBERGER, *Primary Examiner.*

A. P. HALLUIN, *Assistant Examiner.*

U.S. Cl. X.R.

71—106